Figure 1:
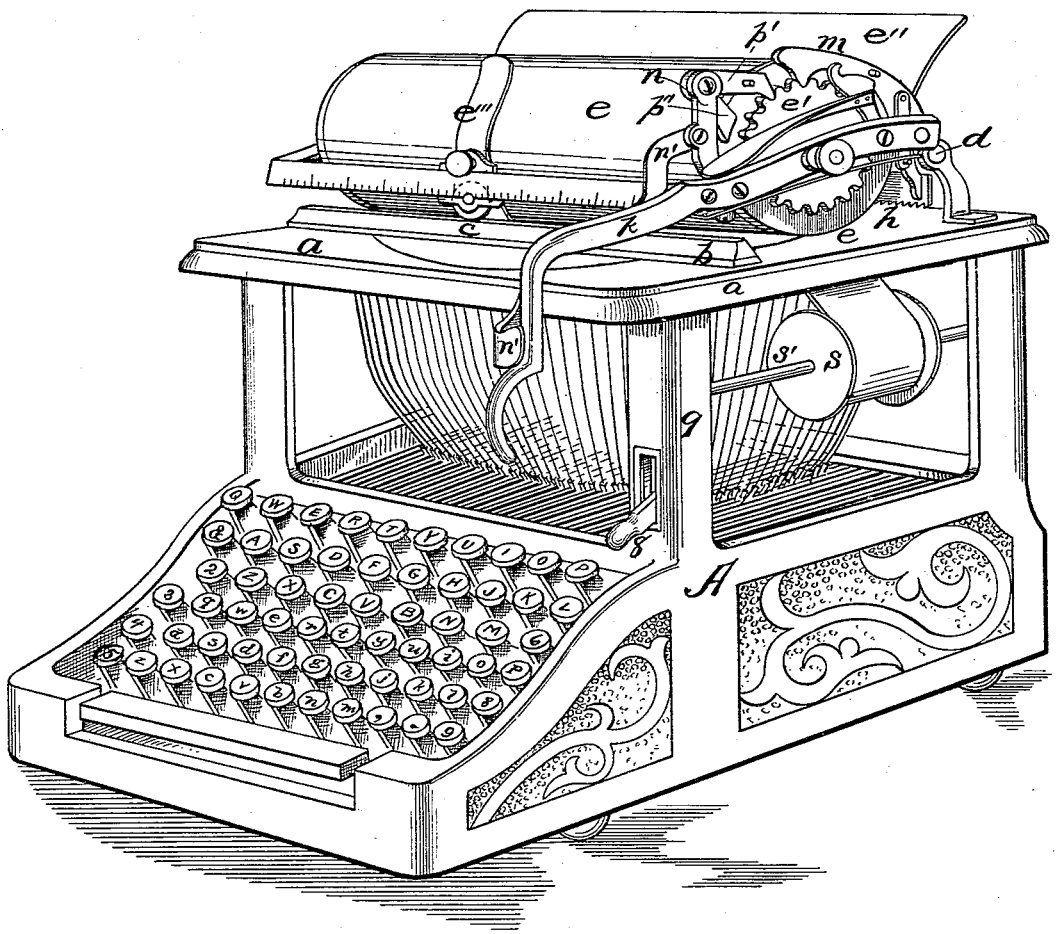

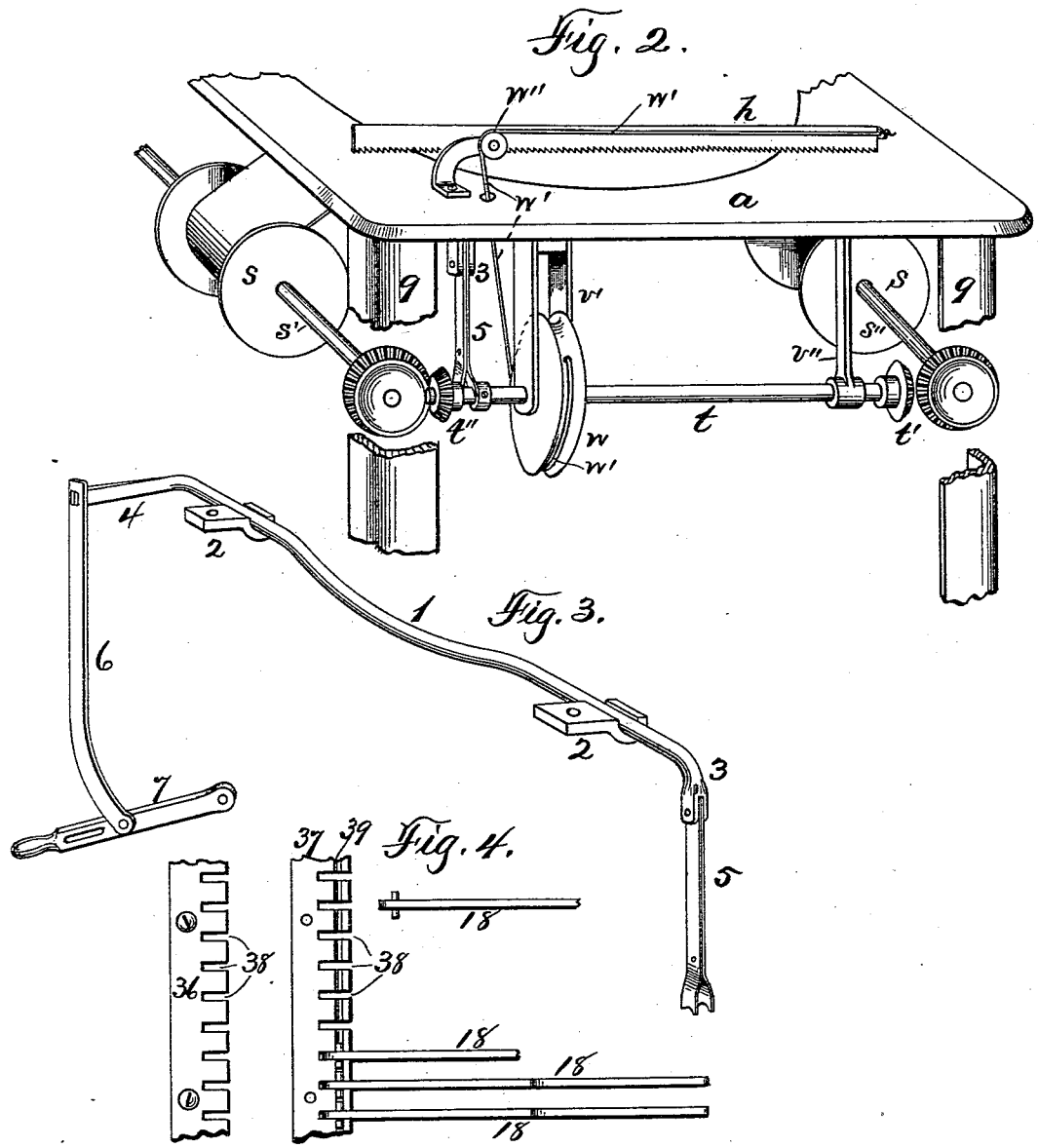

(No Model.) 7 Sheets—Sheet 3.
F. L. TWISS & L. A. BARBER.
TYPE WRITING MACHINE.
No. 560,012. Patented May 12, 1896.
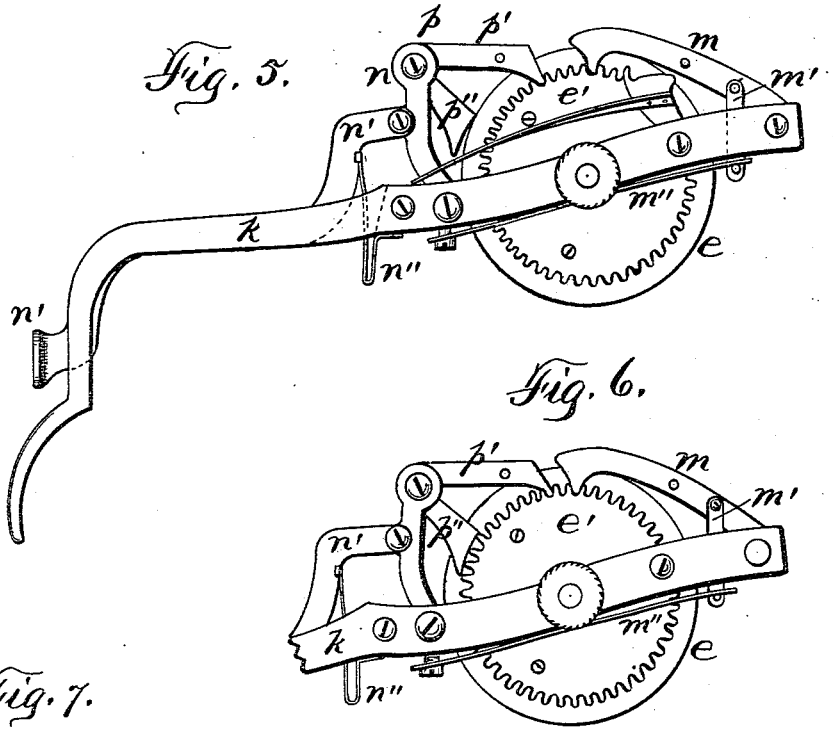
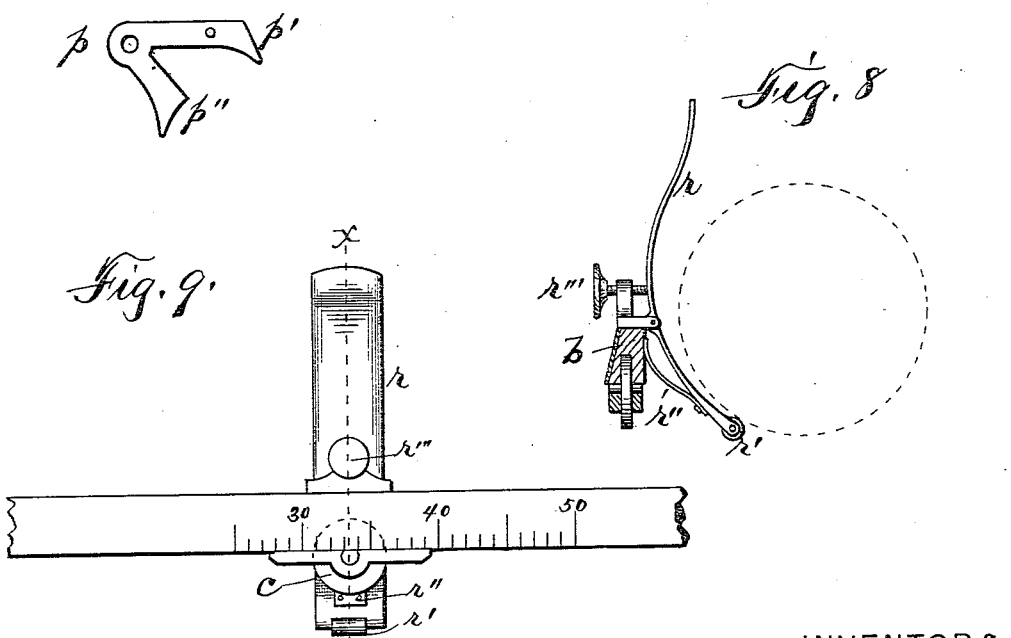
WITNESSES: INVENTORS
Freeman L. Twiss &
Luther A. Barber
By Smith & Denison
their ATTORNEYS.

(No Model.) 7 Sheets—Sheet 4.
F. L. TWISS & L. A. BARBER.
TYPE WRITING MACHINE.
No. 560,012. Patented May 12, 1896.
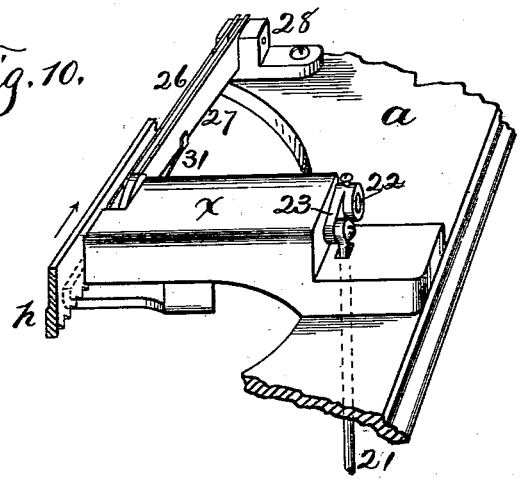
Fig. 10.
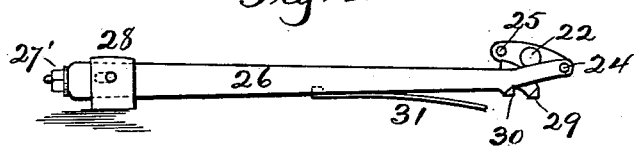
Fig. 11.
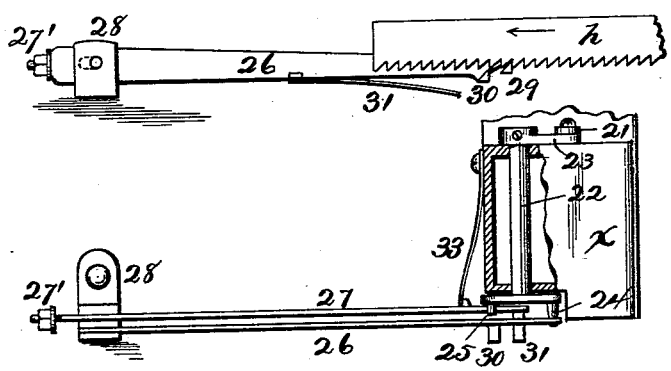
Fig. 12.
Fig. 13.
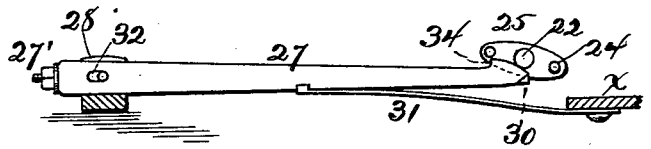
Fig. 14
WITNESSES:
H. A. Carhart
C. B. Kinne
INVENTORS
Freeman L. Twiss &
Lester A. Barber
By Smith & Denison
their ATTORNEYS.

(No Model.) 7 Sheets—Sheet 5.
F. L. TWISS & L. A. BARBER.
TYPE WRITING MACHINE.
No. 560,012. Patented May 12, 1896.
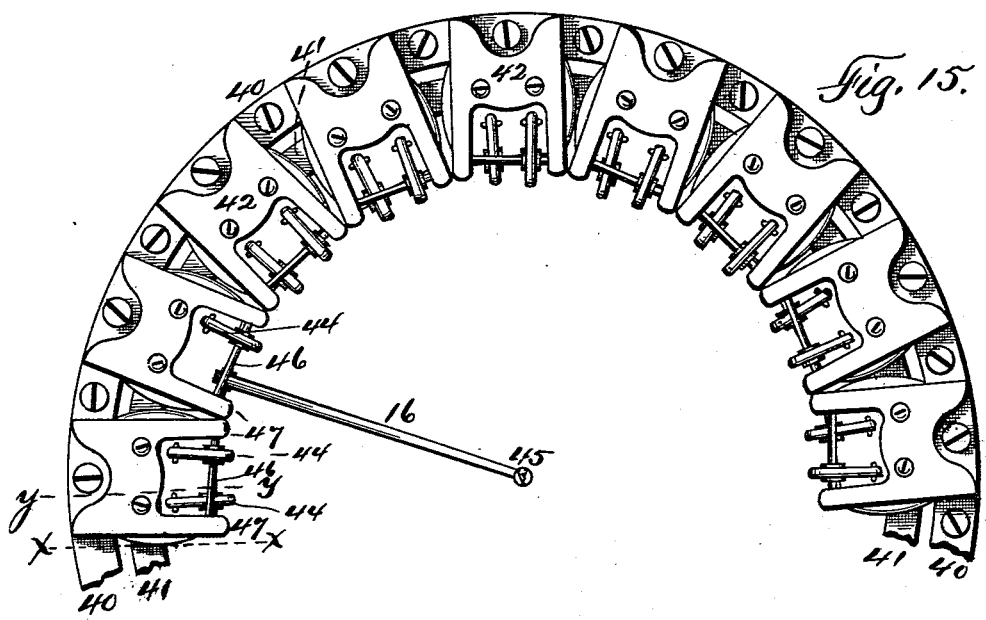
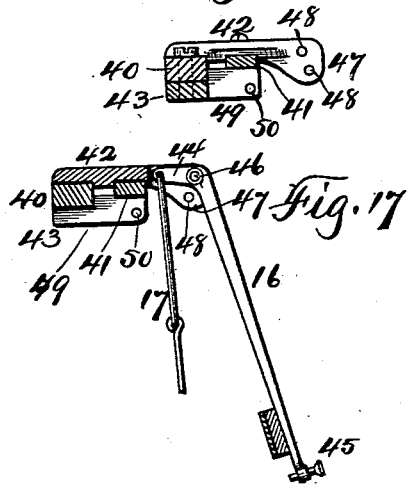
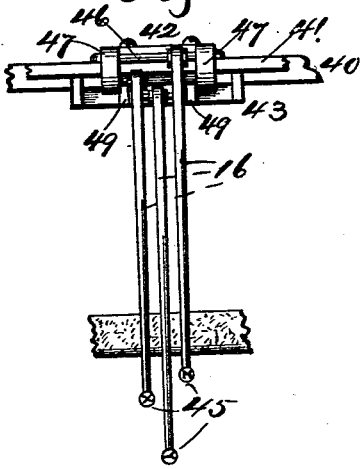
WITNESSES:
H. A. Carhart
C. B. Kimmel
INVENTORS
Freeman L. Twiss &
Luther A. Barber
By Smith & Denison
their ATTORNEYS.

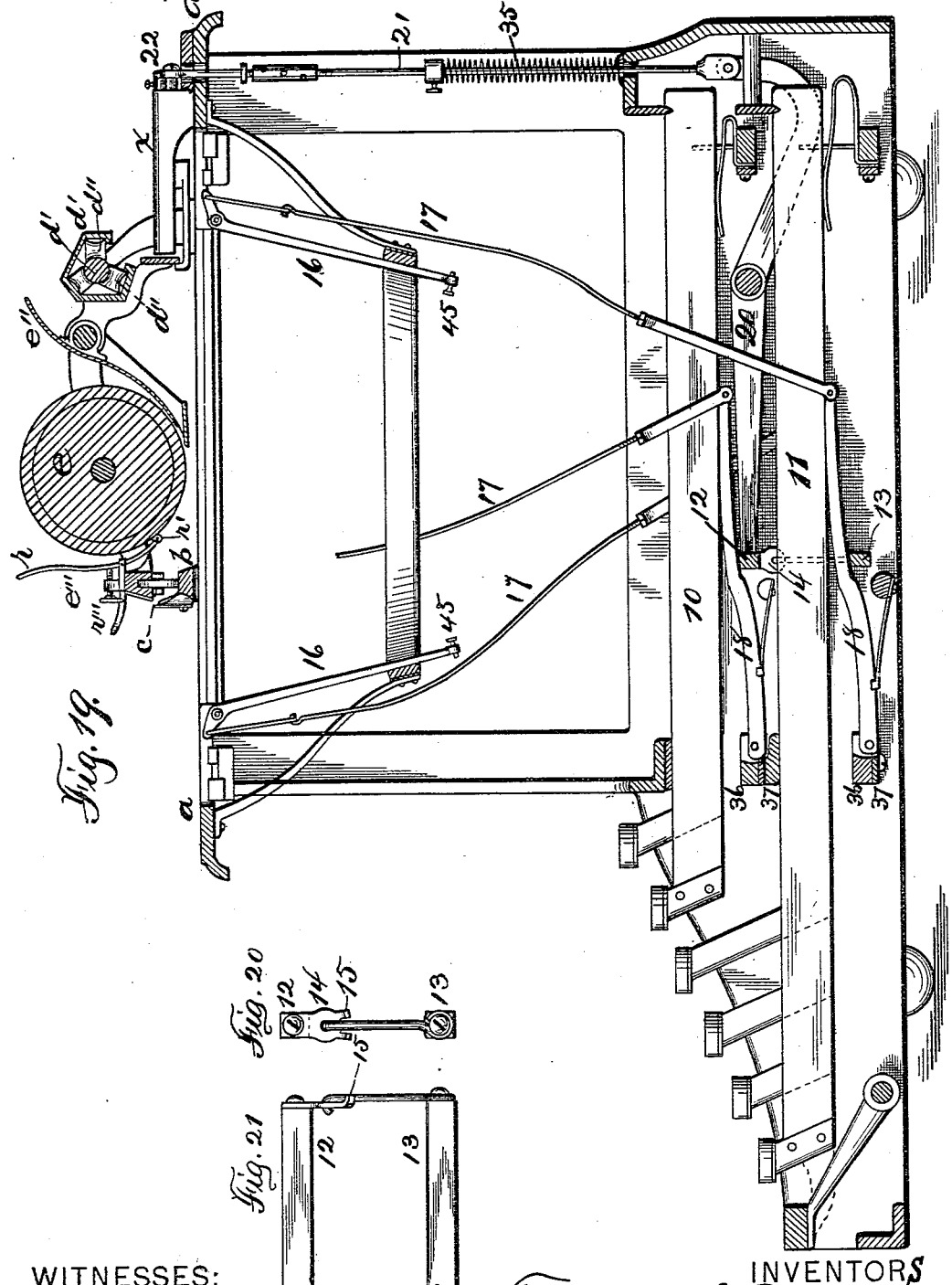

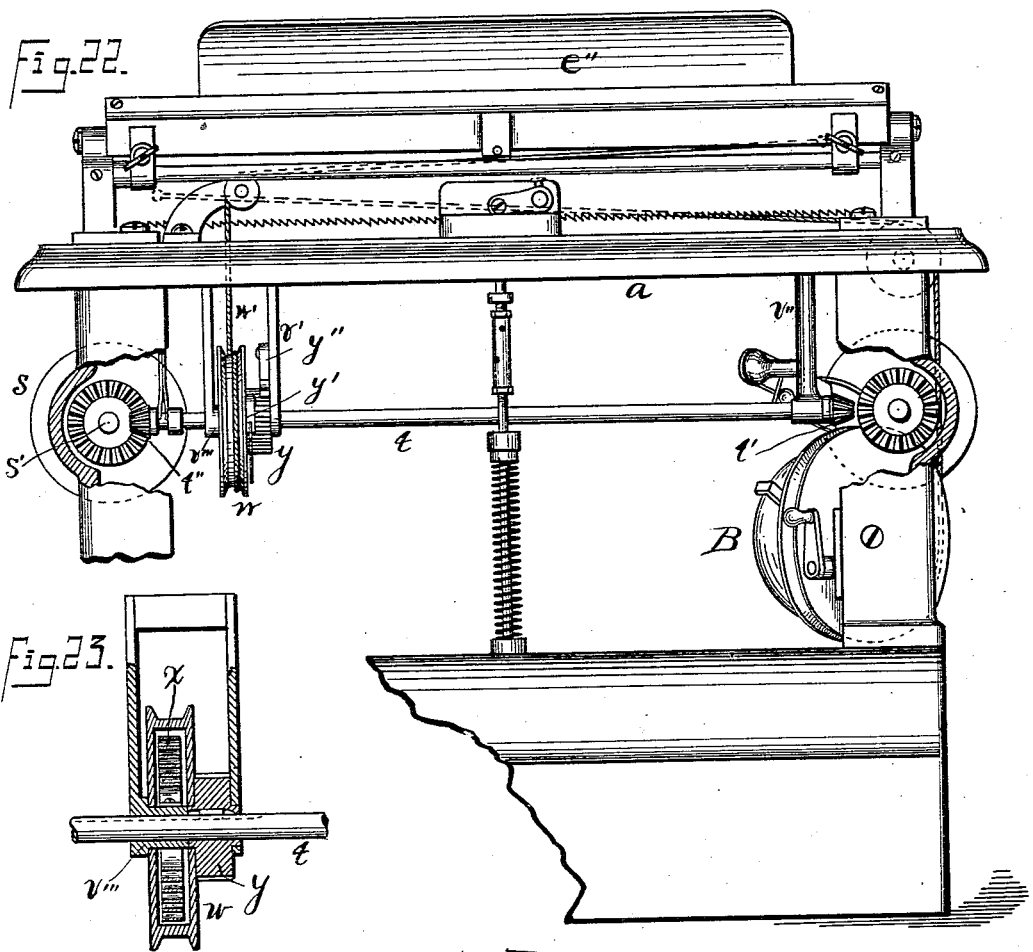
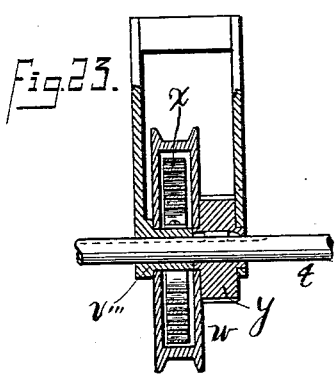
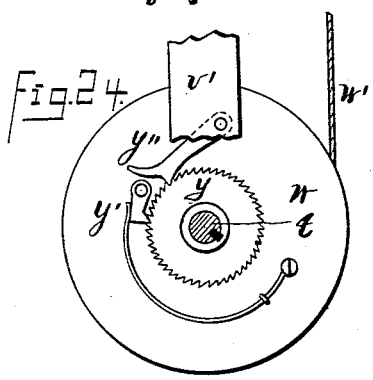
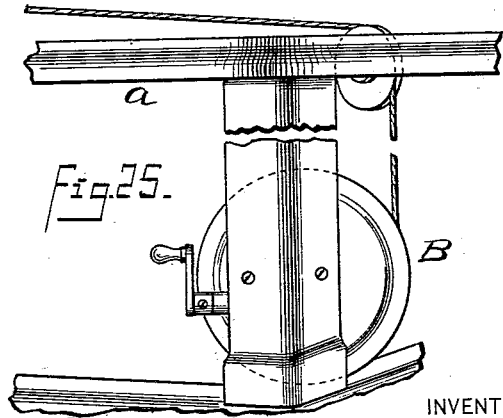

United States Patent Office.

FREEMAN L. TWISS AND LUTHER A. BARBER, OF GROTON, NEW YORK, ASSIGNORS TO HOWARD P. DENISON, TRUSTEE, OF SYRACUSE, NEW YORK.

TYPE-WRITING MACHINE.

SPECIFICATION forming part of Letters Patent No. 560,012, dated May 12, 1896.

Application filed January 31, 1893. Serial No. 460,211. (No model.)

*To all whom it may concern:*

Be it known that we, FREEMAN L. TWISS and LUTHER A. BARBER, of Groton, in the county of Tompkins, in the State of New York, have invented new and useful Improvements in Type-Writing Machines, of which the following, taken in connection with the accompanying drawings, is a full, clear, and exact description.

Our invention relates to type-writing machines and to the particular mechanisms therein for accomplishing certain results in the operation of the machine.

Our object is to provide the machine with the mechanisms hereinafter described for the purposes specified, all to improve the operation of the machine.

Our invention consists in the several novel features of construction and operation hereinafter described, and which are specifically set forth in the claims hereunto annexed. It is constructed as follows, reference being had to the accompanying drawings, in which—

Figure 1 is a perspective view of the machine. Fig. 2 is a perspective view of part of the top-plate machine and the bevel-gear mechanism for driving the ribbon-spools alternately to draw the ribbon off from one, to wind it upon the other, and the means for rotating the drive-shaft by the traverse of the carriage. Fig. 3 is a like view of the mechanism by which the drive-shaft is shifted longitudinally. Fig. 4 is a top plan of the pieces which constitute the bearings of the auxiliary key-levers, showing several mounted in the lower plate and one detached. Fig. 5 is an end elevation of the mechanism for rotating the platen, showing the parts in their normal position. Fig. 6 is a like view of the same, showing the parts in their relative positions when the platen is being rotated for line-spacing and the stop-brake in contact with the ratchet-gear. Fig. 7 is a plan view of the combined push-pawl and brake detached. Fig. 8 is a sectional elevation of the front rail of the carriage-frame and the roller thereunder and the adjustable spring-finger paper-guide. Fig. 9 is a front elevation of the same. Fig. 10 is a perspective view of part of the top of the machine, the letter or word spacing rack-bar, and the pawl mechanism engaging with said bar and constituting the spacing mechanism. Fig. 11 is an end elevation of the rock-arms upon the rear end of the rock-shaft and the spacing-bars actuated by said arms. Fig. 12 is an elevation of part of the rack-bar and spacing-bars, showing one in engagement with the rack. Fig. 13 is a top plan of the spacing-bars, rock-shaft, and arms thereon adapted to engage with said bars, part of the casing inclosing said shaft, and in which it is mounted, being broken away. Fig. 14 is a sectional elevation of one spacing-bar, the arms upon the rock-shaft, and the return-spring in engagement with said bar. Fig. 15 is a top plan of part of the type-bar ring and the hangers thereon in which the type-bars are mounted. Fig. 16 is a vertical transverse sectional elevation of said ring and hanger on line X X. Fig. 17 is a like view on line Y Y, showing one type-arm and pull-rod. Fig. 18 is a front elevation of part of the ring, a hanger, and three type-arms mounted therein. Fig. 19 is a vertical sectional elevation of the machine from front to rear. Fig. 20 is an elevation of the connection between the two sections of the spring-bail. Fig. 21 is a front elevation of part of each section of said bail and of the connection between them, whereby the lower section can swing freely forward and back. Fig. 22 is a rear elevation of the machine, partly broken away to show the ribbon-feed mechanism. Fig. 23 is a vertical sectional elevation of the ribbon-feed spring-wheel. Fig. 24 is a side elevation of the same. Fig. 25 is a detail of the carriage-feed spring-wheel and its mounting.

A is the case of the machine, of which $a$ is the top plate, and the carriage is mounted thereon in front upon the rail $b$, upon which the front wheel $c$ travels, and in the rear upon the rod $d$, surrounded by the casing $d'$ and the grooved rollers $d''$, Fig. 19. This carriage carries the platen $e$, having a circular rack $e'$ upon one end, the apron $e''$, the paper-guide $e'''$, the line-spacing ratchet mechanism, the letter and word spacing rack-bar $h$, and the lifting-rod $k$.

The line-spacing mechanism consists of the rack $e'$, the pawl $m$, pivoted to the carriage-frame, the link $m'$, connected to the pawl, and the spring $m''$, engaging with the link to hold the pawl in proper engagement with the rack, the post $n$, pivotally connected to the carriage-frame, the push-bar $n'$, connected to the post, the spring $n''$, engaging with said bar, and the angular pawl $p$, pivotally connected to said post and comprising a pawl proper, $p'$, and a brake $p''$. Then to rotate the platen for line-spacing when we shove the push-bar inward the pawl $p'$ rotates the platen until the brake is swung into contact with the rack and positively stops both the inward movement of the push-bar and the forward rotation of the platen, and at the same time the pawl $m$ has snapped from one rack-tooth to another until, when the platen is stopped, it is in full engagement to hold the platen against backward rotation. Then when the push-bar is retracted the pawl $p$ is drawn back until it is in new engagement with a tooth of said rack. The brake $p''$ operates as aforesaid to stop and limit the thrust of the pawl, preventing the rotation of the platen farther than desired for proper line-spacing, to stop such rotation at the proper point for the engagement of the pawl $m$, and also operates as a counterweight to the pawl $p'$ to insure its proper engagement with a ratchet-tooth when this pawl is retracted by the spring $n''$. It performs these additional functions not inherent to the line-spacing mechanism shown in the Letters Patent granted to us April 26, 1892, No. 473,485.

The paper-guide comprises the following several parts, Figs. 8 and 9: the curved sheet-metal finger $r$, connected to the front rail $b$ and carrying a roller $r'$, a spring $r'''$, bearing against said rail to hold said roller in contact with the platen, and a thumb-screw $r''''$, engaging with said finger to throw the finger-roller away from one sheet of paper to several thicknesses.

The ribbon-feed and shifting mechanism, Figs. 2, 3, 22, 23, 24, and 25, comprises the following parts, viz: the ribbon-spool $s$, mounted upon shafts $s'$ and $s''$, respectively, and mounted in the posts of the machine-frame, and a cross-shaft $t$ across the rear of the machine provided on its ends with bevel-gears $t'$ and $t''$ and supported by the hangers $v'$ and $v''$ and adapted to slide in each. The movement of the carriage in printing, actuated by the spring-wheel B, unwinds the cord from the wheel $w$, rotating the shaft $t$ and the proper ribbon-spool through the bevel-gears then in mesh and winding the ribbon onto the thus-rotated spool from the other. This also winds up the spring $x$. Then when the carriage is shifted the spring $x$ rotates the wheel $w$ backward, rewinding the cord thereon, the pawls then slipping over the ratchet-teeth, and reengaging therewith when the backward movement of the carriage stops, and in this manner the ribbon is intermittently drawn in one direction as long as the same ribbon-spool, shaft, and gear are in engagement with the same gear $t$, from which wheel a cord $w'$, secured at one end thereto and partly wound around it, leads over a pulley $w''$, supported above the top plate $a$, to and is secured to the end of the rack-bar $h$.

The spring-wheel consists of a hollow case having a grooved periphery, and it is centrally journaled, substantially as shown, upon a stationary tubular boss $v''''$ upon one of the legs of the hangers $v'$, and $x$ is a spring within said case, having one end secured to said boss and the other to said case. A ratchet-wheel $y$ is splined onto the shaft $t'$, and $y'$ is a spring-detent pivoted upon said case and engaging with said ratchet, $y''$ being a gravity-pawl pivoted upon the other leg of the hanger $v'$ and also engaging with said ratchet.

B is a carriage-feeding spring-wheel of any desired construction, connected to the carriage by a cord or chain in the usual manner.

The shifting mechanism to reverse the feed of the ribbon comprises the following parts, viz: a shaft 1, carried by hangers 2, secured to the under side of the top plate, having at one end a vertical crank-arm 3 and at the other end a lateral arm 4; a rod 5, connected to the arm 3 and adapted to fit onto the shaft $t$, between the collars 5 thereon, and a connecting-rod 6, connected at one end to the arm 4 and at the other to the lever 7, which is pivotally connected to the frame, shown as passing through a slot 8 in a corner-post 9, Fig. 1, so that when the lever is depressed the shaft $t$ is forced one way and when it is raised throwing the shaft the other way, thus bringing one or the other pair of bevel-gears into the mesh.

The letter and word spacing mechanism is constructed and operated as follows, Figs. 10, 11, 12, 13, 19, 20, and 21: A vertically-movable bail is suspended from the frame, and in a machine having a double bank of key-levers 10 and 11, one bank above another, the bail consists of two sections, the upper one 12 and a lower and swinging one 13, each carrying one bank of keys and connected together by means of the eye 14, secured to the section 12, and a hooked rod secured to the other section, said eye being provided with arms 15 to regulate the extent of the swing, if desired. The key-levers are connected to the type-arms 16 by the rods 17 through the auxiliary levers 18, to which the rods 17 are connected. A rod 19 is secured across the frame, upon which a lever 20, central to the bail-section 12, is pivoted, its front end being secured to said bail-section, and its curved and upwardly-bent other end is pivotally connected to the escapement-rod 21, so that when a key-lever is depressed this rod is raised. A horizontal rock-shaft 22 is mounted in a case $x$ upon the top plate and is provided with a crank-arm 23, to which the escapement-rod 21 is connected. The other end of the rock-shaft is provided with a head projecting laterally on two sides, and is provided with pins 24 and 25, projecting from each end in lines parallel to said shaft. Pawls 26 and 27 are pivotally hung in a block 28 upon the top plate, and one of them, 26, is connected to the pin 24. Each pawl is provided with a tooth 29 and 30, respectively, adapted to properly fit the rack-teeth of the rack-bar $h$. The pawl 27 is provided with a supporting-spring 31, secured to the top plate or to the bottom of the casing 23, which holds its tooth in engagement with the rack-teeth. The pawl 26 is normally out of engagement with the rack, while the pawl 27 is normally in engagement therewith. Further, the pawl 27 is slotted at 32, so that it can slide longitudinally, and 33 is a spring bearing against a shoulder upon it and operating to force it inwardly, except when it is forced outwardly by its engagement with the rack and the tension of the spring-wheel upon the carriage. Then when the escapement-rod is lifted, as aforesaid, the shaft is rocked, the pawl 26 is raised, the pin 25 is thrown down into contact with the shoulder 34 on the pawl 27 and operates to force it out of engagement with the rack, while at the same time the pawl 26 is raised into engagement at the instant when the pawl 27 is separated therefrom. At this instant the spring 33 forces the pawl 27 longitudinally and inwardly the length of the slot 32, which is equal to a letter or word space or a rack-tooth, or substantially so, and then when the escapement-rod is forced down by the spring 35 thereon the pawl 27 is released and the spring 31 raises it into engagement with the tooth next to that with which it was in engagement, and the pawl 26 is disengaged from said rack. At the instant of the disengagement of one pawl and the reëngagement of the other the tension of the spring-wheel will force the carriage and rack-bar along the distance equal to the length of the slot 32, and the carriage is fed one space. This forward movement of the carriage being induced by the tension of the spring, being greater than that of the spring 33, and by the overcoming of the latter the spring 33 operates as an elastic buffer to receive the impact and reduce its force, and thereby substantially prevent the clicking noise usually incident to the operation of a rack-and-pawl escapement. The pawl 26 may also be provided with a slot 32. A nut and washer 27' upon the outer end of the pawl 27 may also be adjusted to regulate the longitudinal movement of the pawl when the slot 32 is longer than a letter-space and to take up the wear upon the pawl-tooth 30 or upon the rack-teeth.

In Figs. 4 and 19 we show our new bearing-bar for the outer ends of the auxiliary key-levers 18, consisting of a bar in two longitudinal sections 36 and 37, each provided with edge slots 38, which are equidistant and coincident when the sections are secured together. One section is also provided with a longitudinal groove 39, which receives the gudgeon-bearings of these levers 18, while their outer ends fit in said slots, and the other section is a retaining-bar to hold all of said levers in their bearings. The bearing-section of each bar is secured across the machine, while the retaining-bar is removable, so that by removing it any lever 18 can be removed and another put in without disturbing the others.

The type-bar ring, Figs. 15, 16, 17, and 18, consists of two concentric annular rings 40 and 41 of sheet metal and the bearing-plates 42 and 43, in which the type-arms 16 are journaled, each type-arm consisting of a body bent to form a crank 44 at one end, to which the pull-rod 17 is connected, and adapted to carry a type 45 in its other end and a shaft 46, to which the arm is secured, as shown. The plates 42 consist of a body having parallel forks or arms 47 upon its inner end, each arm standing in a plane vertical to that of the body and being provided with holes 48, which are in such alinement that when the shafts 46 for two type-arms are in said holes such shafts will not be parallel, and therefore the type-arms do not stand at a right angle to their shafts. The plate 43 consists of a body and parallel arms 49 thereon, which stand in a plane vertical to the body and are each provided with a bearing 50 for the shaft of a type-arm, which latter shaft may be at right angles to the type-arm. All of these type-arms are consequently in sets of three, each set carried by what we term one "hanger," and all strike a common center when operated, though of varying length, according to the varying distance of their bearings from the center. These plates are secured to the rings by screws, as shown, and either plate can be readily removed, or any set of type-arms, without affecting another set.

What we claim as our invention, and desire to secure by Letters Patent, is—

1. The combination with the platen, the ratchet-wheel on the end thereof, and the lifting-bar, of the oscillating post connected to said bar, a push-bar connected to said post, a combined push-pawl and brake pivotally connected thereto, and adapted to swing thereon, when the pawl is actuated to rotate the platen, and bring the brake into frictional contact with the ratchet, and a platen-holding pawl pivotally connected to said handle, a link connected to this pawl, and a spring engaging with said link.

2. In a type-writing machine, the combination with the carriage and the spring-wheel actuating it for its forward movement, of the ribbon-spools and their shafts provided with bevel-gears upon their rear ends, a drive-shaft having a bevel-gear on each end, a spring-wheel thereon connected to the carriage and adapted to rotate said shaft when actuated by the backward movement of the carriage.

3. In a type-writing machine, the combination with the carriage and its actuating spring-wheel, of another spring-wheel connected to the carriage, the drive-shaft upon which the latter spring-wheel is mounted, the ribbon-spools and their shafts, the bevel-gearing upon the spool and drive shafts, and means to shift the drive-shaft longitudinally to reverse the ribbon-feed.

4. The combination with the carriage and its actuating spring-wheel, of the ribbon-spools and their supports, and another spring-wheel operatively connected to the spools to rotate them and connected to and driven by the carriage.

5. The combination with the carriage and its actuating spring-wheel, of the ribbon-spools, and their supports and another spring-wheel connected to the spools and to the carriage and adapted to rotate each spool separately to feed the ribbon in opposite directions.

6. The combination with the rack-bar of a type-writer carriage, of a primary pawl normally in engagement with the rack, a secondary pawl adapted to be moved longitudinally when in engagement with said rack, a rock-shaft having a head adapted to engage with said pawls when rotated, and means to rotate said shaft.

7. The combination with the key-levers, of the bail consisting of sections, the lower one adapted to swing upon the upper one, the escapement-lever connected to the upper bail, the escapement-rod connected to said lever, and the pawl mechanism operated by said rod.

8. A type-bar ring consisting of concentric annular sheet-metal rings parallel to each other, an upper plate secured thereto and provided with arms standing in a plane vertical to their bodies, a lower plate having like arms, and the shafts of the type-arms journaled in said arms, and means to secure said plates and rings together.

In witness whereof we have hereunto set our hands this 7th day of July, 1892.

FREEMAN L. TWISS.
LUTHER A. BARBER.

In presence of—
C. W. SMITH,
HOWARD P. DENISON.